United States Patent [19]

Parks et al.

[11] Patent Number: 5,278,966

[45] Date of Patent: Jan. 11, 1994

[54] TOROIDAL COMPUTER MEMORY FOR SERIAL AND PARALLEL PROCESSORS

[75] Inventors: Allen D. Parks; James C. Perry, both of Fredericksburg, Va.

[73] Assignee: The United States of America as represented by the Secretary of the Navy, Washington, D.C.

[21] Appl. No.: 546,595

[22] Filed: Jun. 29, 1990

[51] Int. Cl.⁵ .............................................. G06F 12/02
[52] U.S. Cl. ............................. 395/425; 314/DIG. 1
[58] Field of Search .......................... 364/200; 395/400

[56] References Cited

U.S. PATENT DOCUMENTS

| | | | |
|---|---|---|---|
| 3,587,068 | 6/1971 | Strawbridge | 340/170 |
| 3,848,234 | 11/1974 | MacDonald | 395/425 |
| 3,924,244 | 12/1975 | Seitz | 364/400 |
| 3,976,980 | 8/1976 | Hertz | 340/172 S |
| 4,186,440 | 1/1980 | Miller et al. | 364/900 |
| 4,442,495 | 4/1984 | Sukonick | 340/521 |
| 4,667,308 | 5/1987 | Hayes et al. | 395/425 |

*Primary Examiner*—Joseph L. Dixon
*Assistant Examiner*—Reba I. Elmore
*Attorney, Agent, or Firm*—John D. Lewis; Jacob Shuster

[57] ABSTRACT

The toroidal computer memory system utilizes toroidal memory paths in its architecture to enable memory locations along those paths to be obtained in a single access, as compared to multiple accesses typically required by conventional linear computer memory. The storage/retrievable media is designed to replicate paths on the surface of a torus. By defining certain parameters and the mathematical properties of these memory paths in the electronics of a controller, points on the memory paths can be accessed from the storage/retrieval media more efficiently than conventional computer memory.

2 Claims, 4 Drawing Sheets

RAM GROUP ID

TOROIDAL COMPUTER MEMORY FOR SERIAL AND PARALLEL PROCESSORS

BACKGROUND OF THE INVENTION

The invention disclosed herein was made in the performance of official duties by employees of the Department of the Navy and may be manufactured, used, and licensed by or for the Government for any governmental purpose without payment of royalties.

The invention relates generally to computer memory architecture and specifically to a toroidal computer memory for serial and parallel processors.

Conventional computer memory is structurally linear in nature and data is stacked linearly in the memory chips. Thus, access can only occur in a one directional linear manner. The efficiency of this type of memory architecture is limited when used in such applications as matrix and array processing. As a result, software must be used to manipulate accessed data outside memory in order to place it in proper form for processing and updating. In addition, when conventional memory is shared in a multiple processor environment, memory access control acquires additional complexity in order to prevent access collision.

OBJECTS OF THE INVENTION

The object of a toroidal memory architecture is to alleviate the problems associated with conventional computer memory by providing a storage/retrieval media which can efficiently service associated computational processes with closed paths of memory locations that can be obtained in a single access. Multiple accesses are typically required to obtain these same memory locations when using conventional computer memory.

SUMMARY OF THE INVENTION

The toroidal computer memory system accomplishes its stated objectives by utilizing selectable memory paths to store and retrieve data. The memory paths are designed to model paths on the surface of a torus. By using the mathematical properties of the toroidal paths, the memory system is configured to store or retrieve data corresponding to points on the memory paths. These paths can be obtained in a single access compared to the multiple accesses typically required by conventional computer memory. Random Access Memory (RAM) chips, multi-port RAM integrated circuits, optical storage devices, or specially designed chips can be used as the storage/retrieval media for the toroidal computer memory system.

DETAILED DESCRIPTION OF THE INVENTION

The toroidal computer memory overcomes certain inherent limitations of conventional computer memory by using the properties of a torus to design a memory architecture which can read from or write to memory path locations in a single access as compared to the multiple accesses typically required to access these same memory locations by conventional memory.

Figure 3:
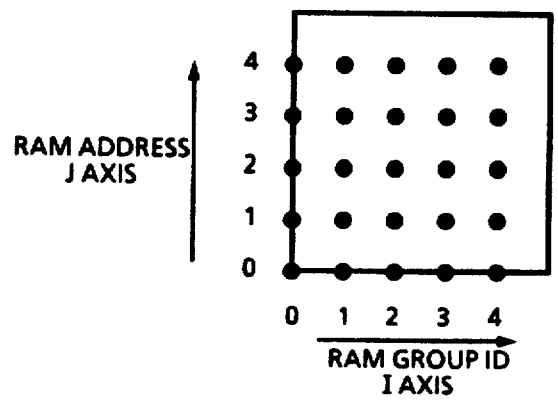
FIG. 3 is a rectangular representation of the set of memory words corresponding to the toroidal memory system in FIG. 2. The arrows indicate the edges of the rectangle which must be identified by $\Phi_2$ to produce a torus.

The toroidal memory system is designed by defining the following concepts. Each memory word corresponds to a tuple in the set $M = N_1 \times N_2$, where $N_i = \{0, 1, 2, \ldots, n_i\}$, $i = 1, 2$. The symbol, l, represents the wordlength of each memory word. For example, if $l = 1$, the wordlength corresponds to one bit and the system can be programmed for bit level processing. If $l > 1$, the system can be programmed for word level processing. As indicated in FIG. 3, a torus is obtained by identifying the opposite edges of the rectangle $R = \{(x,y)R^2 | 0 \leq x \leq n_1 + 1, 0 \leq y \leq n_2 + 1\}$, where R is the set of real numbers. If $\Phi = \Phi_2 \cdot \Phi_1$, where $\Phi_1: M \to R$ is an imbedding such that $(i,j) | \to (i,j)$ and $\Phi_2: R \to T$ is the identification cap, then the associated toroidal memory is defined by the triple $(M, R, \Phi)$. Thus, each memory word in M is associated with a point on the surface of the torus.

Figure 1:
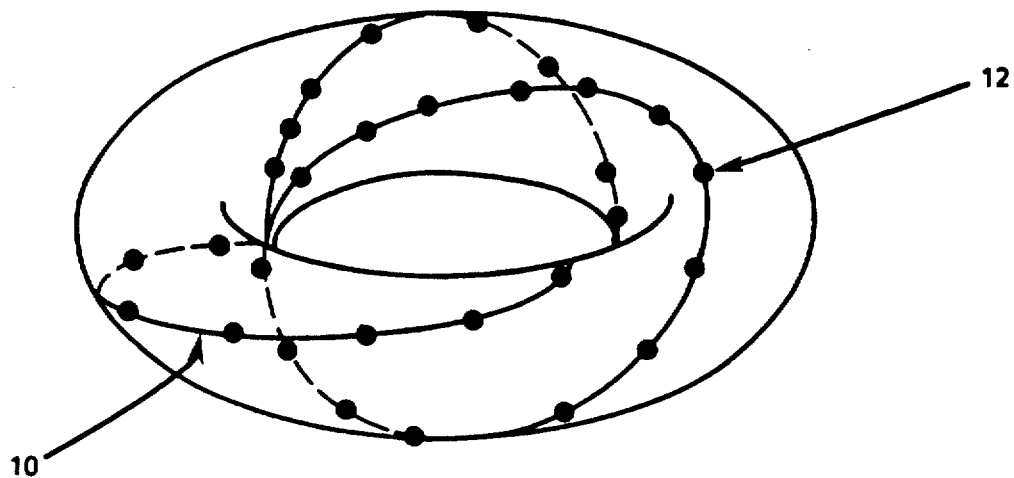
FIG. 1 is a conceptual depiction of a toroidal memory with associated toroidal and memory paths.

A toroidal path is a simple, not necessarily closed, curve on a torus which originates at the origin of rectangle R. A toroidal memory with path accessibility is one in which certain paths contain required collections of retrievable/updatable memory words as subsets. Such collections are called memory paths. If m/n, where $0 \leq m < n_2$ and $0 < n < n_1$, is the slope of a toroidal path in R which contains a memory path, then $K_{m,n}$ and $P_{m,n}$ will be the toroidal path and its associated memory path. A conceptual depiction of a toroidal path 10 and its associated memory path 12 is shown in FIG. 1.

The following theorems describe the key features of toroidal and memory paths. These theorems are paramount to the design of the toroidal memory system and are embodied within the electronics of the memory controller. Let (a,b) denote the greatest common divisor of a and b, X denote the set of all i coordinates in $P_{m,n}$, k be a non-negative integer, $k_{max}$ a maximum permitted value for k, and $n_i' = n_i + 1$, $i = 1, 2$.

| Theorem 1. | $P_{m,n} = \{(\text{mod}(kn, n_1'), \text{mod}(km, n_2')) \mid 0 \leq k \leq k_{max}\}$ |
|---|---|
| Theorem 2. | If $(n_1', n) = 1$ and $k_{max} \geq n_1$, then $X = N_1$. |
| Theorem 3. | Let $(n_1', n_2') = r$, where $n_1' = ar$, $n_2' = br$, $(b, m) = q$, and $b = cq$. If $(n_1', n) = 1$, then $K_{m,n}$ is closed for $k_{max} = (cn_1' - 1)$. |

It is important to note for design purposes, that if $n_1' = n_2'$ is chosen to be a prime number, then $(n_1', n) = 1$ for all $n \leq n_1$, $c = 1$, and $k_{max} = n_1$.

The toroidal computer memory can be constructed using the Random Access Memory (RAM) chip as the basic building block for the system. The memory system utilizes $n_1 + 1$ groups of l independently addressable RAM circuits and $n_2 + 1$ address locations within each RAM circuit, where the RAM group IDs are in one-to-one correspondence with $N_1$ and the RAM addresses are in one-to-one correspondence with $N_2$, so that (RAM group ID, RAM address) is an element of M. The associated toroidal memory (M,R, $\Phi$) with memory path access can be obtained by identifying the opposite edges of R and using Theorem 1 as a memory path location address pair generator, where RAM group ID=mod(kn, $n_1'$) and RAM address=mod(km, $n_2'$). Thus, for each k, $0 \leq k \leq k_{max}$, an address pair (RAM group ID, RAM address) is generated for a memory location in memory path $P_{m,n}$. The rule, RAM identifier=1*RAM group ID+(J-1), where $1 \leq J \leq l$ is used to control the addressing within a RAM group and insures that identical RAM addresses are received by each RAM circuit within the group.

Figure 2:
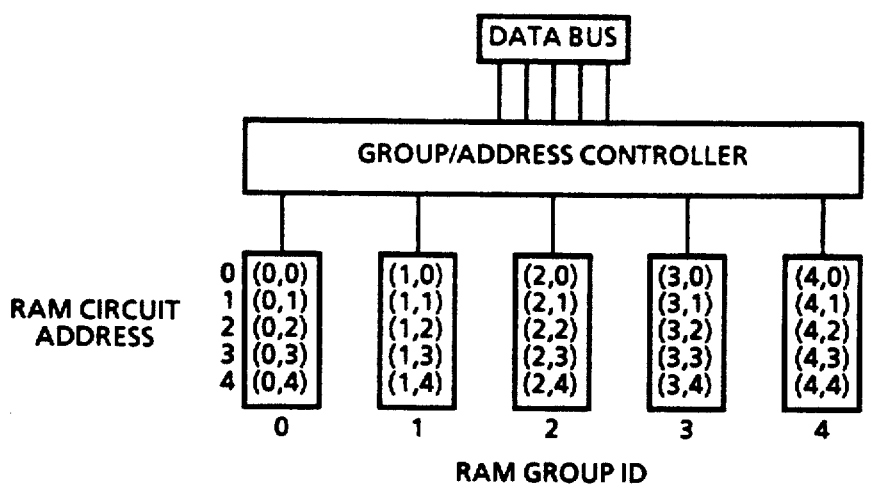
FIG. 2 is a simple configuration of the components of a toroidal computer memory system using toroidal and memory paths as depicted in FIG. 1.

An example of a simple toroidal memory system is shown in FIG. 2. This example uses five independently addressable RAM circuits, five consecutive RAM addresses within each circuit, a five-bit data bus, and a wordlength, l, of one (bit level processing). The group-/address controller contains functions which control the memory access of the system. Theorem 1 above is used as a RAM group ID and address pair generator function. Thus, for a given k, m, and n, the RAM group ID=mod(kn, $n_1'$) and the RAM address=mod(km, $n_2'$). In this particular example, the RAM identifier will be identical to the RAM group ID since l=1. Additionally, an origin shift parameter, $y_o$, and origin controller function can be used to shift the origin to a desired location. Otherwise, the origin will always be at zero. Use of the origin shifter will provide additional autonomy to the toroidal memory system. In the examples below, $y_o=0$. $Y_o$ is, however, shown explicitly on pertinent figures. Also, in general, since there are typically many more than $N_2$ RAM addresses available in each RAM circuit, many toroidal memory structures can be placed in such an architectural configuration by layering them consecutively. Thus, an OFFSET parameter can be used by the controller to access a particular toroidal memory structure contained within the configuration.

The set of all memory locations contained within the simple memory system of FIG. 2 is shown in FIG. 3. The RAM group ID represents the i axis and the RAM address represents the j axis. The memory location pair (RAM group ID, RAM address) is a point of $M=N_1 \times N_2$, where $N_1=N_2\{0,1,2,3,4\}$. $P_{m,n}$ n memory path requests, i.e. 3-tuples of the form $(m,n,k_{max})$, are sent to the controller for use in path access. The controller functions process the path requests to access the memory paths within the system as shown in the process flow diagram of FIG. 5.

Figure 5:
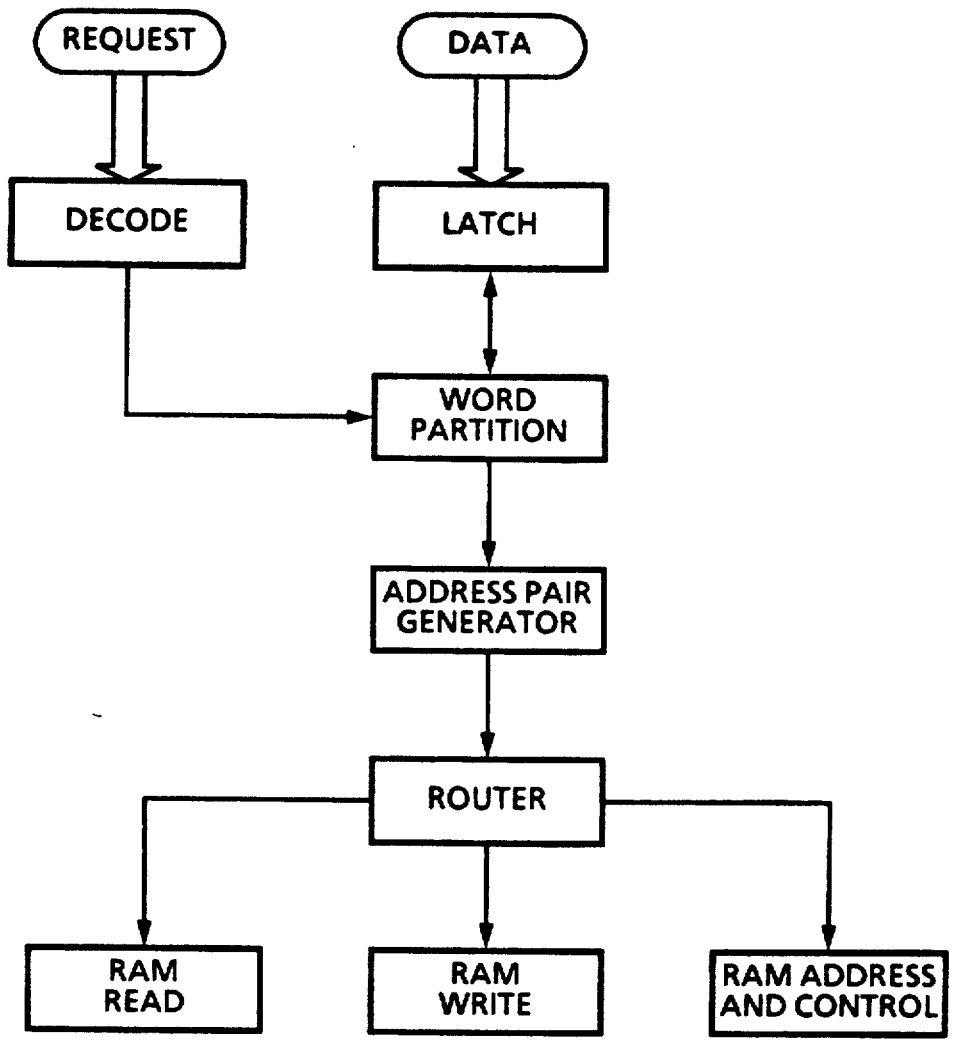
FIG. 5 is a process flow diagram showing how the controller functions process the path requests to access the memory paths within the system, as exemplified in FIG. 4.

Referring to FIG. 5, Request contains encoded information concerning m, n, $y_o$, and whether to "read" or "write". The former three will determine the slope of the memory path and the first memory location. Also, OFFSET and l are provided to control RAM group ID addressing. DECODE then decodes the request. If the request is a "write data", then LATCH, as used here, means that the data is held here for l-bit partitioning by WORD PARTITION. If the request is "read", WORD PARTITION associates each l bits to be read with the appropriate $0 \leq k \leq k_{max}$. If the request is "write", WORD PARTITION breaks the data word into its l-bit subwords and associates the appropriate $0 \leq k \leq k_{max}$ with each subword. (Note that kmax is a parameter fixed by the electronics).

Figure 6:
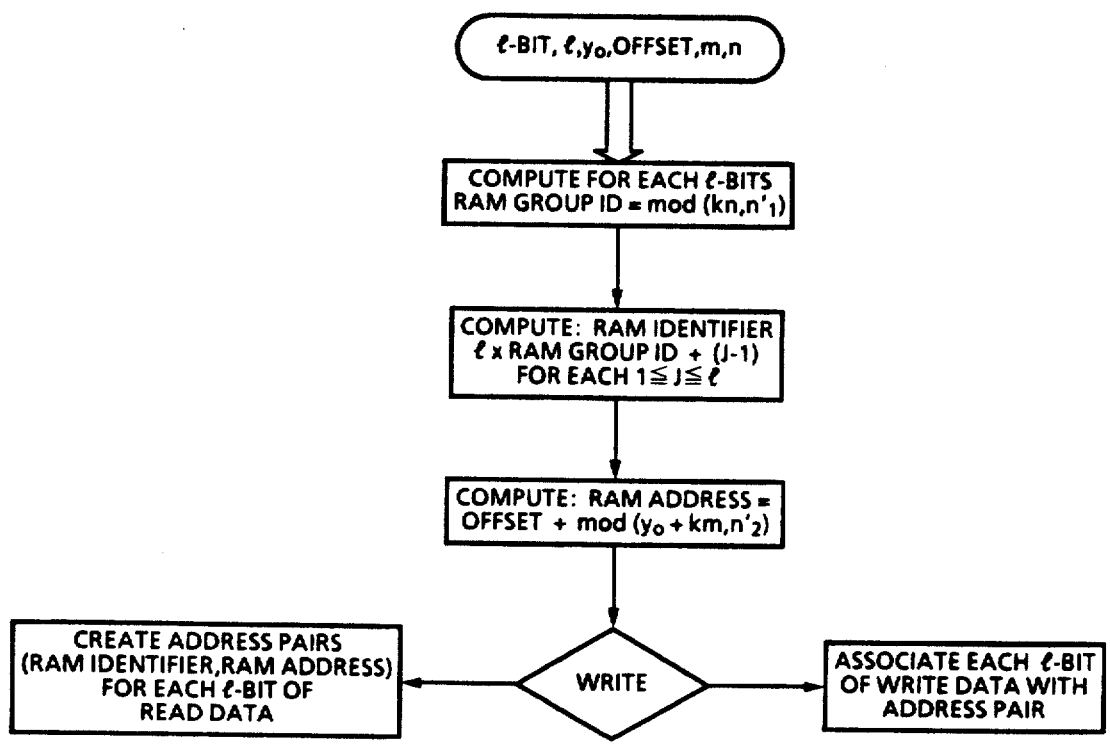
FIG. 6 is a logic flow diagram showing the computational processes of the address pair generator of FIG. 5.

The address pair generator uses the memory path slope in conjunction with k, $y_o$, l, and OFFSET to determine the RAM group ID address and the RAM address for each group. FIG. 6 shows the processes used to calculate each address. If the request was "write", the address pair generator associates each 1 bit of write data with an address pair (RAM identifier, RAM address). If the request was "read", the address pair generator creates address pairs for each 1 bit of read data. The information is then sent to the ROUTER. If the request is "read", then ROUTER sends the read request for each 1 bit to the appropriate RAM identifier and provides each RAM circuit with the required RAM address. If the request is "write", then ROUTER sends write request with each 1 bit of data to the appropriate RAM identifier and provides each RAM circuit with the required RAM address.

FIG. 4 shows several examples of $P_{m,n}$'s accessed from the system in FIG. 2. FIG. 4A shows $P_{2,3}$ with a path slope of $\frac{3}{2}$. Here, since five addresses in each of the five independently addressable RAM circuits are used, $n_1'=n_2'=5$, which is a prime number. Therefore, $k_{max}=4$ and all $K_{m,n}$ $P_{m,n}$ are closed (Theorem 3). The toroidal path $K_{2,3}$ begins at the origin, increases with a slope of $\frac{3}{2}$, and closes upon itself at the origin after spiraling around the torus twice latitudinally and three times longitudinally. The address pairs corresponding to the set of memory locations which comprise the memory path $P_{2,3}$ associated with $K_3$ are given by $P_{2,3}=\{(mod(3*k,5), mod(2*k,5)) | 0 \leq k \leq 4\}$, and are evaluated in Table 1.

TABLE 1

| | $P_{2,3}$ Memory Locations | | |
|---|---|---|---|
| k | RAM Group ID = mod(3*k,5) | RAM address = mod(2*k,5) | $P_{2,3}$ |
| 0 | 0 | 0 | (0,0) |
| 1 | 3 | 0 | (3,2) |
| 2 | 1 | 4 | (1,4) |
| 3 | 4 | 1 | (4,1) |
| 4 | 2 | 3 | (2,3) |

Figure 4A:
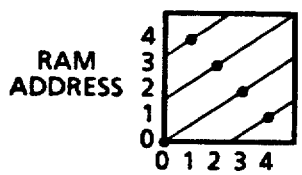
FIG. 4 shows a few of the specific memory paths capable of being selected in the simple toroidal memory system of FIG. 2.
Figure 4B:
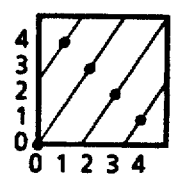
Figure 4C:
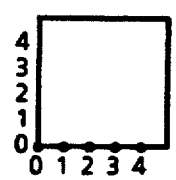
Figure 4D:

Note that the modular arithmetic functions in the controller wrap the path around the torus to access all the other points shown in FIG. 4A. FIGS. 4B-D are representations of $P_{3,2}$, $P_{1,2}$, and $P_{0,1}$ with path slopes of 3/2, $\frac{1}{2}$, and 0 respectively. These paths are generated in the same way as $P_{2,3}$, shown in FIG. 4A. FIG. 4D shows $P_{0,1}$ with a path slope of zero. Thus, $P_{0,1}$ is identical to a word extracted from conventional RAM memory with address of zero. By continuously shifting the origin from one RAM address to the next via the origin shift parameter, the toroidal memory replicates the structure of conventional linear RAM memory. The data contained in each $P_{m,n}$ shown above is retrievable or updatable in a single access and multi-port RAM devices may be used to service multiple processors in a shared memory environment.

The example shown in FIG. 2 is merely one representative embodiment of a toroidal computer memory system and general RAM based toroidal memory systems can utilize as many RAM circuits as is feasible for the associated data bus of the processor(s). The memory system can also be constructed using multi-port RAM integrated circuits, optical storage devices, or specially designed chips in place of the conventional RAM devices.

What is claimed is:

1. In a computer memory comprised of a plurality of independently addressable memory circuits arranged to have $n_1'$ groups of 1bit words addressable in a parallel fashion and $n_2'$ addresses within each of aid groups wherein $n_1'$ and $n_2'$ are the same prime number, a method for providing simultaneous access to uniquely addressed 1-bit memory circuits in each of said groups wherein said simultaneous access occurs along a simulated toroidal surface path representation of said memory, said method comprising the steps of:

selecting path slope parameters n and m, $n \neq 0$, wherein a path slope m/n relates to the slope of a line on a plane model rectangular representation of a torus, said plane model having a (0,0) origin coordinate, I-axis indices extending $n_1 = (n_{1'} - 1)$ units from said origin coordinate, and J-axis indices extending $n_2 = (n_{2'} - 1)$ units from said origin coordinate, wherein said I-axis units are indexed in accordance with said groups and said J-axis units are indexed in accordance with said addresses;

generating $n_1'$ address pairs in a memory controller, each of said address pairs having a coordinate identifying one of said groups in accordance with (mod(kn, $n_1'$)) and a coordinate identifying one of said addresses in accordance with (mod(km,$n_2'$)) for k=0 to n $_1$; and accessing, via a data bus having $n_1'$ parallel data lines, said memory circuits identified by said $n_1'$ address pairs.

2. In a computer memory comprised of a plurality of independently addressable memory circuits arranged to have $n_1'$ groups of 1-bit words addressable in a parallel fashion wherein each group is further arranged in a plurality of indexable sets having $n_2'$ addresses within each set and wherein $n_1'$ and $n_2'$ are the same prime number, a method for providing simultaneous access to uniquely addressed 1-bit memory circuits in each of said groups wherein said simultaneous access occurs along a simulated toroidal surface path representation of said memory, said method comprising the steps of;

selecting path slope parameters n and m, $n \neq 0$, wherein a path slope of m/n relates to the slope of a line on a plane model rectangular representation of a torus, said plane model having a (0,0) origin coordinate, I-axis indices extending $n_1 = (n_{1'} - 1)$ units from said origin coordinate, and J-axis indices extending $n_2 = (n_{2'} - 1)$ units from said origin coordinate, wherein said I-axis units are indexed in accordance with said groups and said J-axis units are indexed in accordance with said addresses;

generating $n_1'$ address pairs in memory controller, each of said address pairs having i) a coordinate indentifying one of said groups in accordance with $(l \times mod(kn,n_1') + (j-1))$ for each $1 \leq J \leq l$ and for k=0 to $n_1$ and ii) a coordinate identifying one of said addresses in accordance with (OFFSET+-mod(km,$n_2'$)) for k=0to $n_1$, wherein said OFFSET parameter is provided to identify a starting address of one of said indexable sets; and accessing, via a data bus having $(l \times n_1')$ parallel data lines, said memory circuits identified by said $n_1'$ address pairs.

* * * * *